(12) United States Patent
Muramatsu et al.

(10) Patent No.: US 10,675,546 B2
(45) Date of Patent: Jun. 9, 2020

(54) CONTROLLERS FOR GAME MACHINES

(71) Applicant: HORI CO., LTD., Yokohama (JP)

(72) Inventors: Hiroaki Muramatsu, Kanagawa (JP);
Koichiro Amano, Kanagawa (JP);
Yoshinori Konishi, Kanagawa (JP)

(73) Assignee: HORI CO., LTD., Kanagawa (JP)

( * ) Notice: Subject to any disclaimer, the term of this patent is extended or adjusted under 35 U.S.C. 154(b) by 0 days.

(21) Appl. No.: 16/069,157

(22) PCT Filed: Aug. 26, 2016

(86) PCT No.: PCT/JP2016/074950
§ 371 (c)(1),
(2) Date: Jul. 10, 2018

(87) PCT Pub. No.: WO2017/221432
PCT Pub. Date: Dec. 28, 2017

(65) Prior Publication Data
US 2019/0308110 A1   Oct. 10, 2019

(30) Foreign Application Priority Data

Jun. 21, 2016   (JP) .................................. 2016-122808

(51) Int. Cl.
*A63F 13/98*     (2014.01)
*A63F 13/235*    (2014.01)
(Continued)

(52) U.S. Cl.
CPC ............ *A63F 13/98* (2014.09); *A63F 13/235* (2014.09); *A63F 13/24* (2014.09); *G06F 3/0338* (2013.01)

(58) Field of Classification Search
None
See application file for complete search history.

(56) References Cited

U.S. PATENT DOCUMENTS

| 4,552,360 A |   | 11/1985 | Bromley et al. |
| 5,267,181 A | * | 11/1993 | George ............... G06F 3/023 |
| | | | 708/142 |

(Continued)

FOREIGN PATENT DOCUMENTS

| JP | 09-75544 A |   | 3/1997 | |
| JP | 2003-236246 | * | 8/2003 | ............. A63F 13/06 |

(Continued)

OTHER PUBLICATIONS

International Search Report for PCT/JP2016/074950 dated Nov. 8, 2016.

*Primary Examiner* — Jason T Yen
(74) *Attorney, Agent, or Firm* — PK Patent Law (57) ABSTRACT

To improve handheld controllers for game machines so that they hardly drop from the users' hand.
A controller for game machines is held and manipulated with the left hand. The controller for game machines includes a main body 100 and a grip 120. The main body 100 is equipped with a first input device 130 that is manipulated with the thumb and a second input device 140 that is manipulated with the index finger and middle finger. To the main body 100, a loop-shaped band 200 is attached with both ends thereof secured to the main body 100. Users manipulate the controller for game machines while holding the grip 120 using the palm and the fingers other than the thumb of the left hand resting under the band 200.

6 Claims, 9 Drawing Sheets

(51) Int. Cl.
*A63F 13/24* (2014.01)
*G06F 3/0338* (2013.01)

(56) References Cited

U.S. PATENT DOCUMENTS

| | | | | |
|---|---|---|---|---|
| 2002/0060425 | A1* | 5/2002 | Huettlinger | A63F 13/02 273/148 R |
| 2009/0003820 | A1* | 1/2009 | Law | G03B 17/563 396/423 |
| 2012/0258800 | A1* | 10/2012 | Mikhailov | G06F 3/016 463/37 |
| 2012/0302347 | A1* | 11/2012 | Nicholson | A63F 13/24 463/37 |
| 2012/0322553 | A1* | 12/2012 | Burgess | A63F 13/24 463/37 |
| 2013/0059696 | A1* | 3/2013 | Hijmans | A61H 1/0274 482/8 |

FOREIGN PATENT DOCUMENTS

| | | | | |
|---|---|---|---|---|
| JP | 2003-236246 | A | 8/2003 | |
| JP | 2004-171120 | * | 6/2004 | G06F 3/033 |
| JP | 2004-171120 | A | 6/2004 | |
| JP | 2006-109293 | A | 4/2006 | |
| JP | 3132531 | U | 6/2007 | |
| WO | 2010147438 | A2 | 12/2010 | |

* cited by examiner

CONTROLLERS FOR GAME MACHINES

CROSS-REFERENCE TO RELATED APPLICATIONS

This application is a national stage 35 U.S.C. 371 filing of International Application No. PCT/JP2016/074950, filed on Aug. 26, 2016, which claims priority to Japanese Patent Application No. 2016-122808, filed Jun. 21, 2016. The entire contents of the aforementioned applications are herein expressly incorporated by reference.

TECHNICAL FIELD

The present invention relates to controllers for game machines for use in entering input to game machines such as game consoles for domestic use.

BACKGROUND ART

Video games have been widely distributed for a long time. Users play video games on a certain device (platform). Various platforms have been developed for video games including home game consoles/machines for domestic use, general-purpose personal computers, portable game consoles/machines, mobile phones, Smartphones, and arcade games installed in amusement facilities such as amusement arcades.

Although these consoles, devices, and machines all fall within the definition of the "game machine" as used in the invention of the present application, typical game machines in the present application are game consoles for domestic use.

Examples of home game machines for domestic use include PlayStation 4 (trademark) manufactured and sold by Sony Interactive Entertainment Inc. or Xbox One (trademark) manufactured and sold by Microsoft Japan Co., Ltd. For these game machines, a dedicated official controller is often bundled or sold as a separate product and users usually play games using an official controller. Although designs for official controllers have widely varied in the past, a dominant design has begun to emerge. This dominant design has a main body of a laterally elongated shape which users can hold with both hands. The left side half of the main body is equipped with a four-button directional pad that accepts, for example, digital inputs and a stick input device for inputs such as analog inputs that depend on the displacement direction of the stick. The right side half is equipped with four push buttons and another stick input device that is similar to the one just mentioned.

Most controllers for game machines are designed so that they are held and manipulated using both hands.

Nevertheless, for certain kinds of games, users may wish to manipulate a controller using only one hand. Such controllers for game machines of the type held and manipulated using one hand for that purpose have been proposed.

SUMMARY

Problems to be Solved

However, controllers for game machines of the type held and manipulated using only one hand still need to be improved.

Since the handheld controllers for game machines are held and manipulated using only one hand, these controllers can easily slip out of the users' hand as compared with the controllers held and manipulated using both hands.

An object of the present application is to improve one-handed controllers for game machines so that they hardly drop from the users' hand.

Means to Solve the Problems

In order to solve the aforementioned problems, the present inventors propose the following inventions.

The invention of the present application is a controller for game machines includes a main body having a substantially flat user-facing portion in an area visible from a user who is using the controller; a grip protruding from the main body that can be held by a user with the palm and the fingers other than the thumb of one hand, the grip protruding toward the user, as defined in the case where the user is using the controller; and a first input device disposed, as an input device, in an area on the user-facing portion of the main body, the area being manipulable with the thumb of one hand of a user holding the grip.

This controller for game machines includes a loop-shaped band having two ends, each being attached to the main body or near the proximal end of the grip, wherein the controller is configured such that a user can hold the grip with the user's one hand resting under the band.

This controller for game machines is intended to be manipulated using only one hand. It includes the main body and the grip protruding from the main body. The user holds the grip to manipulate the controller for game machines. The user usually uses the thumb of the same hand holding the grip to manipulate the controller. What is to be manipulated is the first input device. Accordingly, the first input device on the user-facing portion of the main body is located in an area within thumb reach. Since it is sufficient for the user-facing portion of the main body of the controller for game machines of the present application to have a space enough to provide the first input device within thumb reach, the size thereof may be smaller than that required for a typical controller for game machines held with both hands, and the lateral length of the main body of the controller for game machines of the present application may be smaller than that required for a typical controller for game machines held with both hands.

The controller for game machines of the present application includes the loop-shaped band having two ends, each being attached to the main body or near the proximal end of the grip. Users can hold the grip with the same hand resting under the band. In this position, they can manipulate the first input device with their thumbs. The band secures the controller for game machines to one hand of the user; therefore, the controller does not easily slip out of the user's hand.

The band of the present application is defined as "loop-shaped." This "loop" herein can either be formed with the band alone or it can be formed with the band and the surface of at least one of the main body and the grip of the controller for game machines. This means that even a band that does not form a complete "loop" falls within the band of the present application that is "loop-shaped."

The first input device is a device for entering input. Details of the first input device do not matter as long as it can be used to enter input. For example, the first input device may include at least one of a four-button directional pad for entering data (e.g., digital data) indicating a direction by pressing either of up, down, right, and left edges thereof, and a stick input device through which data (e.g., analog data) indicating a direction can be entered according to a displacement direction of the stick input device. Of course, in addition to the above, the first input device may also be equipped with a so-called push button or buttons that is/are manipulated by being pressed against the main body.

The controller for game machines of the present application is used in place of, for example, an official controller for game machines for domestic use. Implementing either one or both of a four-button directional pad and a stick input device of an official controller in the controller for game machines of the present application provides users with the functionality to enter (at least some) inputs through the controller for game machines of the present application equal to those entered through an official controller.

The controller for game machines of the present application may further include a second input device disposed on a back, as an input device, the back corresponding to a farther portion of the main body from a user, as defined in the case where the user is using the controller, and is manipulated with at least one finger other than the thumb of one hand of the user.

As described above, the controller for game machines of the present application includes the first input device manipulated by users holding the controller for game machines with the thumb of one hand. However, the first input device alone restricts the types of available inputs. The second input device manipulable with at least one finger other than the thumb of the hand of the user holding the controller for game machines, if disposed on the back of the controller for game machines, allows to increase the types of inputs, which in turn increases the choice of games that users can play.

By providing the second input device to be manipulated with at least one finger other than the thumb of the user's hand that holds the controller for game machines, a situation occurs (at least temporarily) where the user cannot use, for holding the controller for game machines, the at least one finger other than the thumb used to manipulate the second input device. Such situation increases the possibility of the user dropping the controller for game machines. However, since the controller for game machines of the present application has the band as described above, there is no possibility of the user dropping the controller for game machines even with the second input device. The band of the present application is of greater advantage when the second input device is present.

The second input device may have a plurality of operation pieces for being manipulated, the operation pieces being aligned vertically, as defined in the case where the user is using the controller. Such second input device is advantageous for manipulating operation pieces with two or more fingers other than the thumb but it inevitably leads to the time when at least two of the index finger, middle finger, ring finger, and little finger in addition to the thumb of the hand that holds the controller for game machines cannot be used to hold the grip. However, since the controller for game machines of the present application has the band as described above, there is still no possibility of the user dropping the controller for game machines.

Each of the operation pieces may be, but not limited to, a switch which is pressed against the main body, thereby input is entered. This helps to allot the second input device to inputs different from those entered through the first input device especially when the first input device has at least one of the four-button directional pad and the stick input device.

Each end of the band is, as described above, attached to the main body or near the proximal end of the grip. This helps to secure the controller for game machines to one hand of the user with the band. The ends of the band may be attached to anywhere of the main body or the grip near the proximal end thereof as long as this function is achieved.

For example, one end of the band may be attached to an outer side of the grip and the other end of the band may be attached to an inner side of the grip.

Furthermore, a portion around the middle of the band may be wider than the ends of the band. This contributes to a more secure fixing of one hand of users to the controller for game machines with the band. The wider portion may be formed as a separate member from the band and may be movable along the length of the band. By making the wider portion of the band movable along the length of the band, it becomes possible to adjust the wider portion to a position at which one hand of the user is securely fixed to the controller for game machines at the wider portion.

It should be noted that, regardless of whether the band has a wider portion, the entire length of the band may be adjustable. The sizes and shapes of the users' hand vary from user to user; therefore this is also useful to securely fix one hand of a user to the controller for game machines.

DETAILED DESCRIPTION

Preferred embodiments of the present invention are described below with reference to the drawings.

Figure 1:
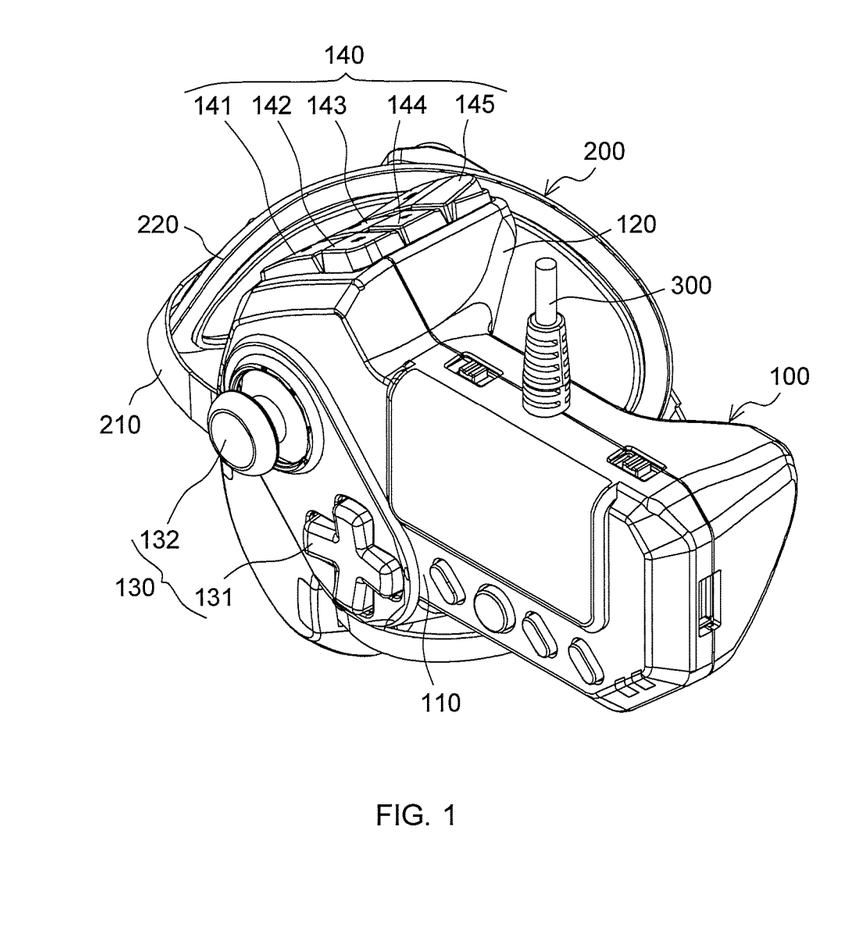
FIG. 1 is a perspective view of a controller for game machines according to an embodiment.

FIGS. 1 to 7 show a controller for game machines according to this embodiment. FIG. 1 is a perspective view, and FIGS. 2 to 7 are a plan view, front view, back view, bottom view, left side view, and right side view, respectively.

The controller for game machines is for entering input to game machines. The game machine is, for example, home game console for domestic use such as PlayStation 4 (trademark) manufactured and sold by Sony Interactive Entertainment Inc. or Xbox One (trademark) manufactured and sold by Microsoft Japan Co., Ltd. This controller for game machines is not limited to those used for entering input to a home game consoles for domestic use as described above. The controller may be, for example, those used for entering input to a general-purpose personal computer that functions as a game machine or for entering input to a portable game console or a Smartphone that functions as a game machine. The controller for game machines in this embodiment is, but not limited to, a controller for entering input to a game machine which is a home game console for domestic use.

The controller for game machines in this embodiment is held and manipulated using one hand. Specifically, the controller for game machines in this embodiment is held and manipulated using the left hand. Needless to say, the controller for game machines may be held and manipulated using the right hand. The controller for game machines in such a case appears, at least to the eye, as the mirror image of the one held and manipulated using the left hand.

The dominant design for official controllers for game consoles has, as described in the background section, a main body of a laterally elongated shape which users can hold with both hands. The left side half of the main body is equipped with a four-button directional pad that accepts, for example, digital inputs and a rod-shaped stick input device for inputs such as analog inputs that depend on the displacement direction of the stick. The right side half is equipped with four push buttons and another stick input device that is similar to the one just mentioned.

The controller for game machines in this embodiment can be considered as, broadly speaking, a controller that is obtained if an official controller as described above were divided into right and left halves such that the left half can be manipulated with left hand with the addition of a band described later.

Details are described below.

Figure 2:
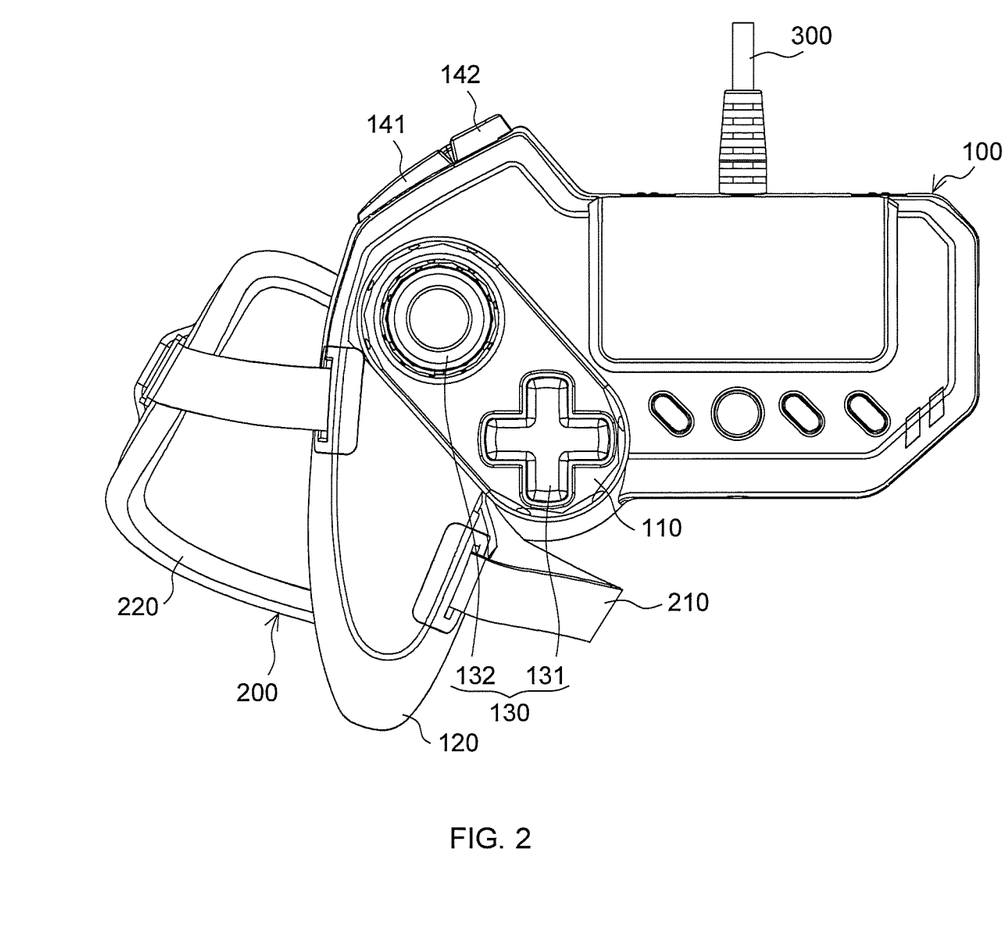
FIG. 2 is a plan view of the controller for game machines shown in FIG. 1.
Figure 3:
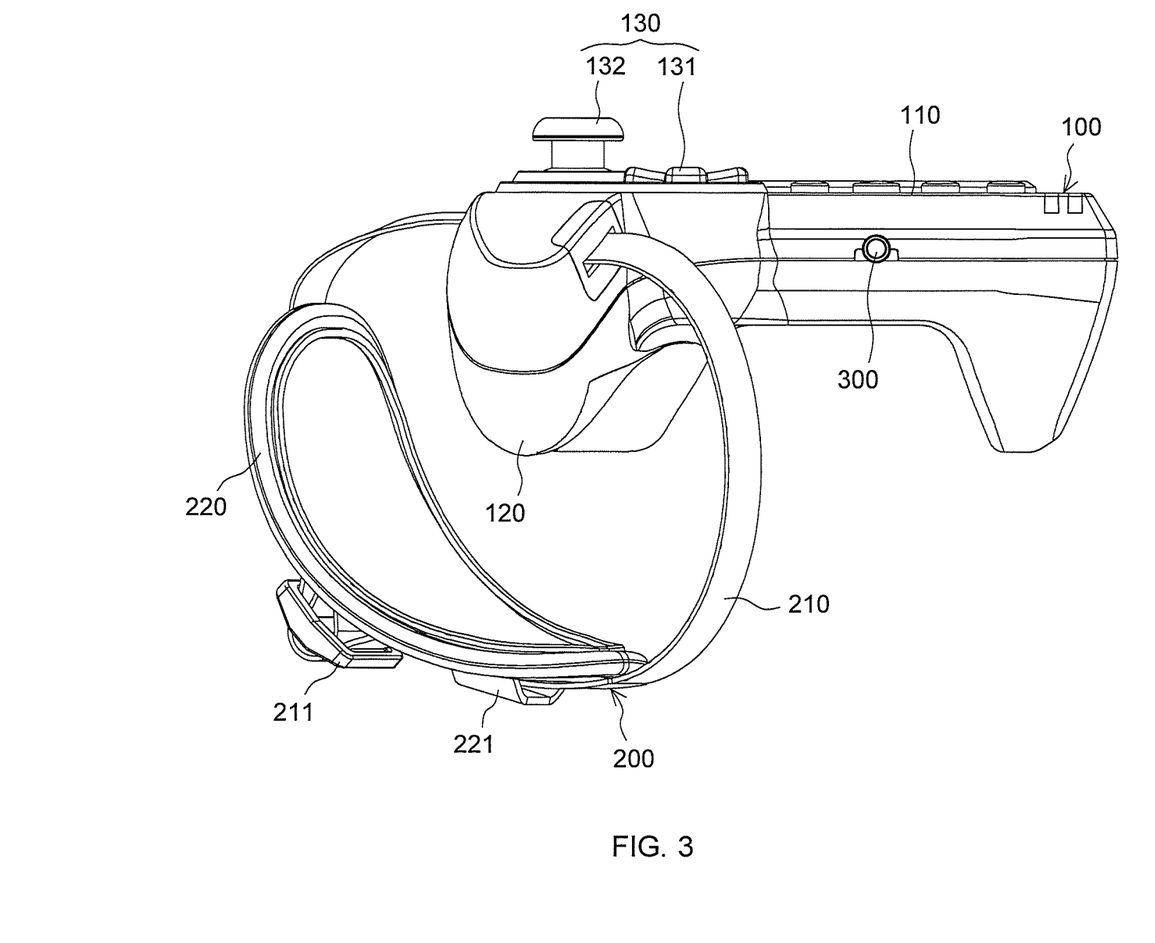
FIG. 3 is a front view of the controller for game machines shown in FIG. 1.
Figure 4:
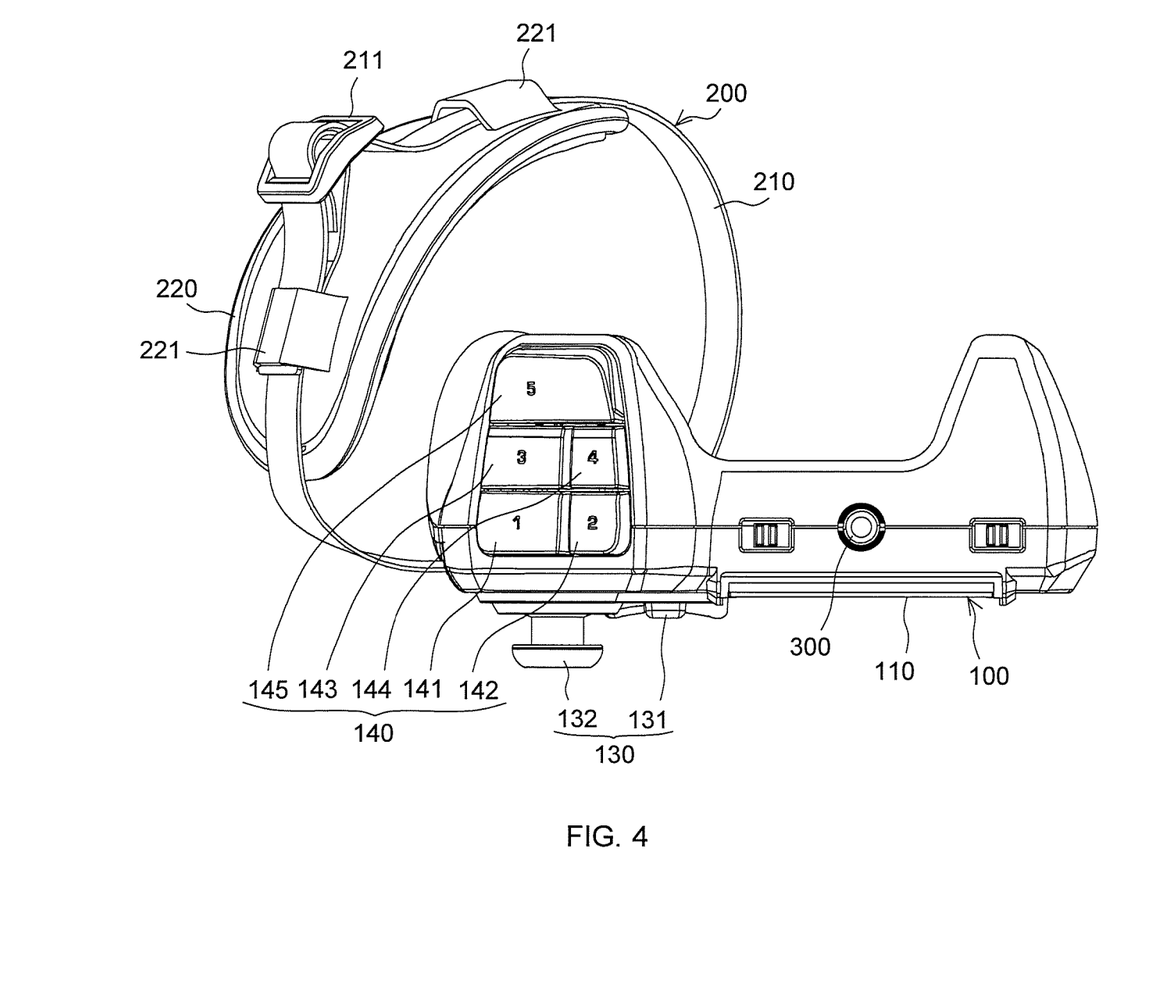
FIG. 4 is a back view of the controller for game machines shown in FIG. 1.
Figure 5:
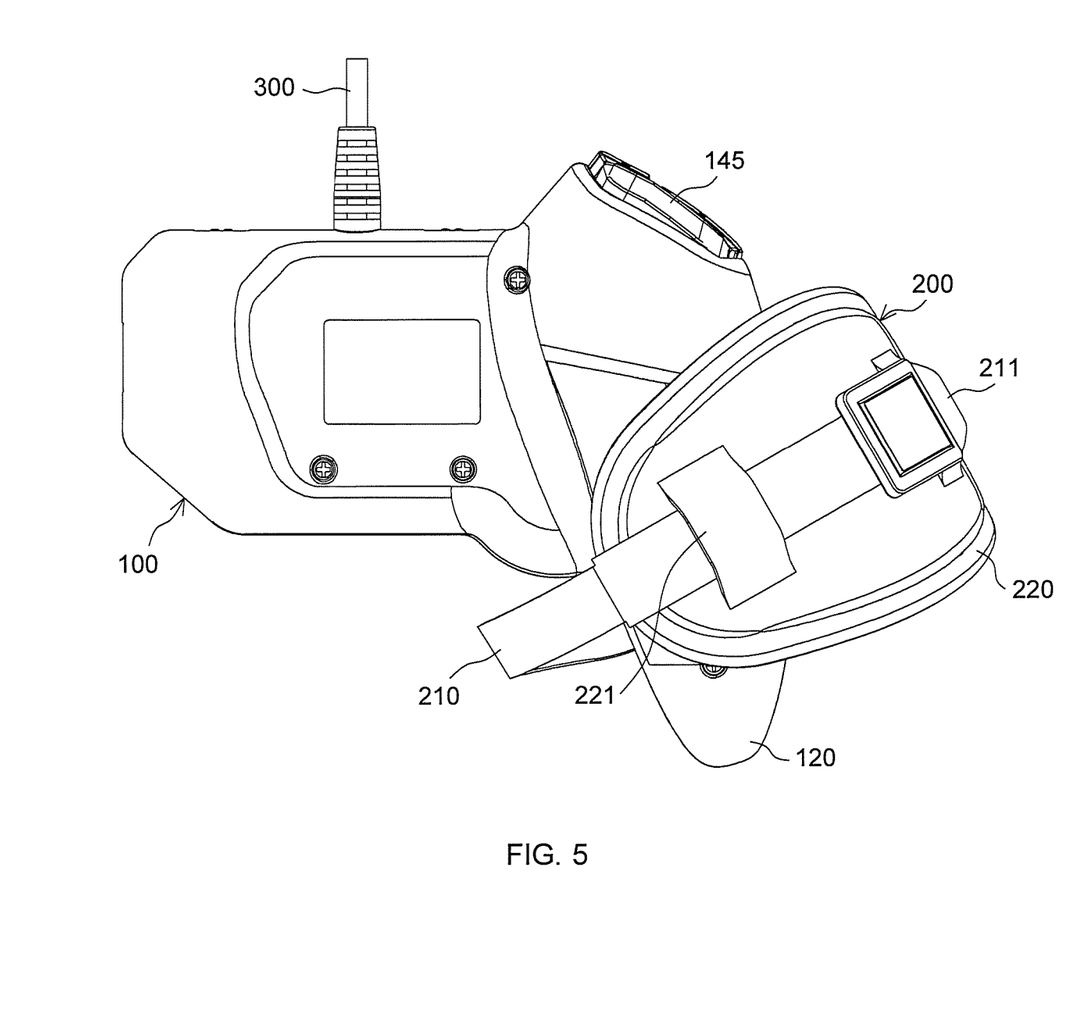
FIG. 5 is a bottom view of the controller for game machines shown in FIG. 1.
Figure 6:
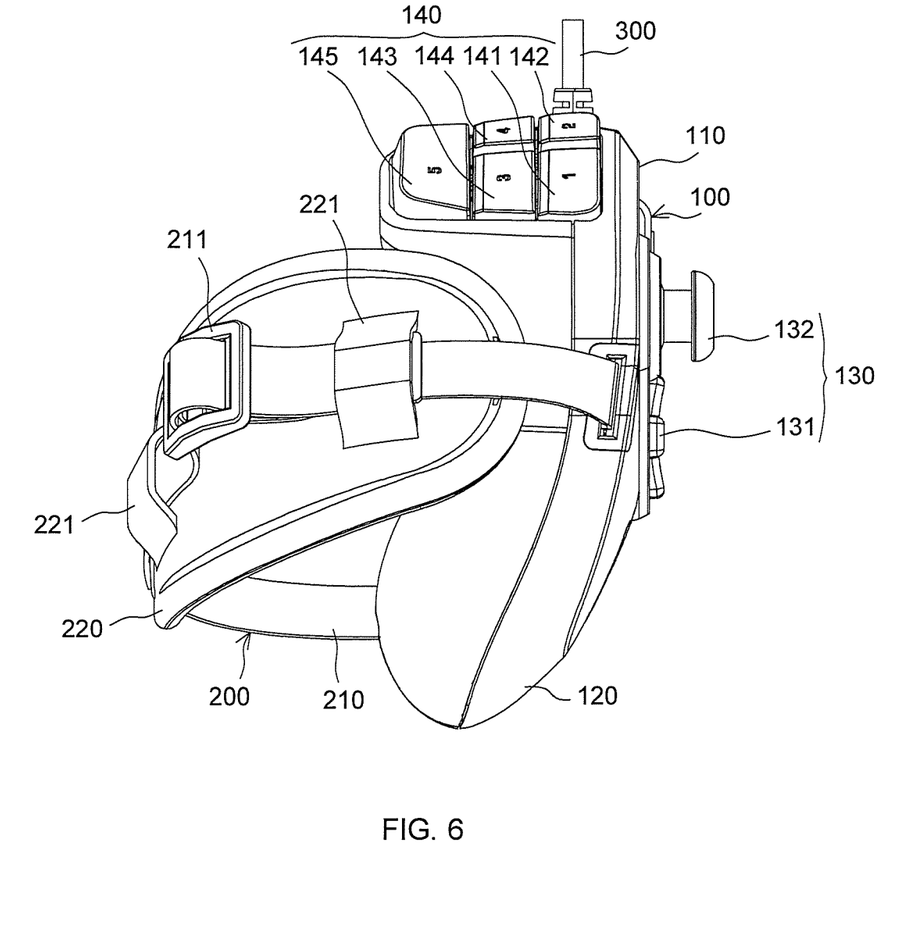
FIG. 6 is a left side view of the controller for game machines shown in FIG. 1.
Figure 7:
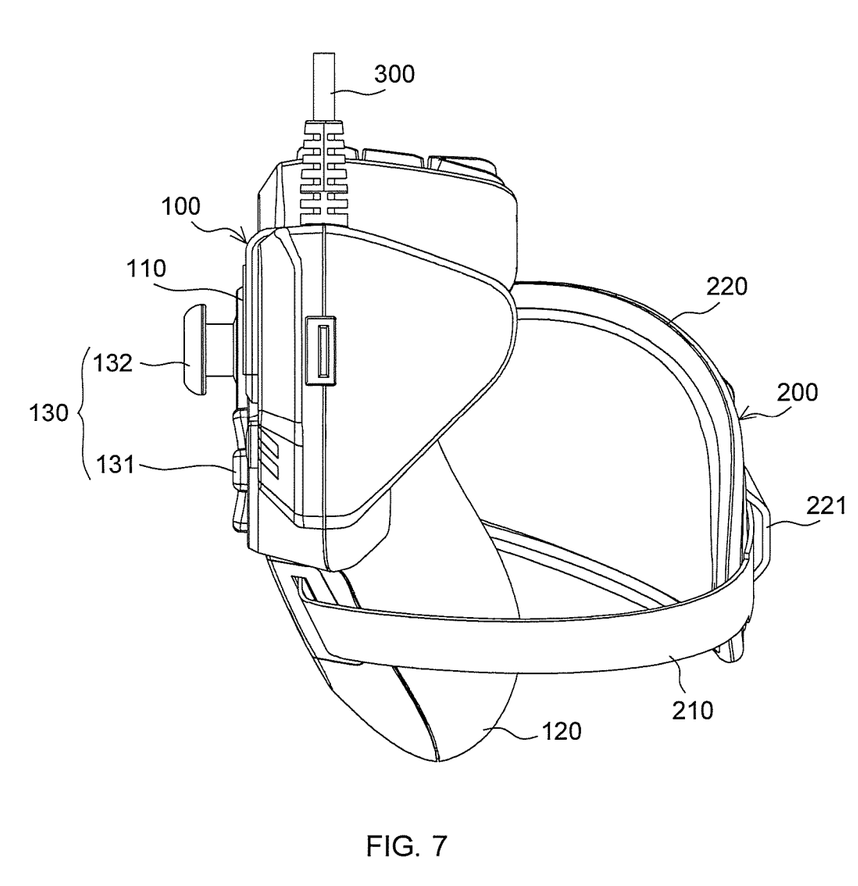
FIG. 7 is a right side view of the controller for game machines shown in FIG. 1.

The controller for game machines has a main body 100. The main body 100 has a substantially rectangular shape when viewed from above. A portion corresponding to the top of the main body 100 in FIG. 2 is a user-facing portion 110 as used in the present application. The user-facing portion 110 is visible from a user when the user is using the controller for game machines and is configured to be substantially flat. It should be noted that the user-facing portion 110 may have an area or areas that is/are lower than the rest of the surface or the entire surface thereof may be smoothly curved. The substantially flat portion where a first input device described later is provided is the user-facing portion 110.

A grip 120 is located on the main body 100 at a lower left in FIG. 2. The grip 120 protrudes toward the user when the user is using the controller for game machines. The grip 120 in this embodiment protrudes from the main body 100 toward the user who is using the controller for game machine, facing, but not limited to, slightly outward (i.e., in a direction from the midline of the user to the outside) as defined in the case where the user is using the controller for game machines and downward as defined in the case where the user is using the controller. The grip 120 is a part that is to be held by users with their left hand. Specifically, the grip 120 has a size and shape suitable for being held by users with their left palm and left fingers other than the thumb. Specifically, the grip 120 has a substantially circular cross-section and is gradually tapered from the base to the tip.

On the user-facing portion 110 of the main body 100, the aforementioned first input device 130 is disposed. The first input device 130 is an input device which users can use for entering input related to games. The first input device 130 is manipulated by users with their left thumb while holding the grip 120 with their left hand. In order to make that possible, the first input device 130 is disposed within thumb reach of users holding the grip 120 with their left hand.

The first input device 130 in this embodiment has, but not limited to a four-button directional pad 131 and a stick input device 132. At least one of them suffices and both are publicly known or widely known. The four-button directional pad 131 is for entering data (e.g., digital data) indicating a direction by pressing either of up, down, right, and left edges thereof. The stick input device 132 is a device through which data (e.g., analog data) indicating a direction (or direction and the amount of displacement) can be entered according to a displacement direction of it. The stick input device has, for example, a rod-like shape and includes, but not limited to, an umbrella-like member at the end thereof where the ball of the thumb rests stably.

The controller for game machines in this embodiment has, but not limited to, a second input device 140. The second input device 140 is disposed on the back of the main body 100 which corresponds to a farther portion of the main body from a user, as defined in the case where the user is using the controller for game machines.

The second input device 140 is an input device which users can use for entering input related to games. The second input device 140 is intended to be manipulated with at least one finger other than the thumb of the left hand that holds the grip 120. The second input device 140 is disposed in an area where users can do it.

The second input device 140 has a plurality of, in particular, but not limited to, five operation pieces 141 to 145 in this embodiment. Users can enter their inputs with, but not limited to, different meanings by manipulating each of the operation pieces 141 to 145. The operation pieces 141 to 145 are aligned in the vertical direction (i.e., the direction along the vertical thickness of the main body 100), as defined in the case where the user is using the controller for game machines. The operation pieces 141 to 145 in this embodiment are aligned in such a manner that, but not limited to, two operation pieces, i.e., the operation piece 141 and the operation piece 142 are located abreast in the top row, and other two operation pieces, i.e., the operation piece 143 and the operation piece 144 are located abreast in the second row. The third row has the operation piece 145 alone. The lateral widths of the operation pieces 141 and 143 are identical to each other. The lateral widths of the operation pieces 142 and 144 are identical to each other. The lateral width of the operation piece 145 is substantially equal to the sum of the lateral widths of the operation pieces 141 and 142, or the sum of the lateral widths of the operation pieces 143 and 144. Although the actual practice depends on the characters of users, among the operation pieces 141 to 145, the operation pieces 141 and 142 are designed on the assumption that users manipulate them with their index finger. The operation pieces 143 and 144 are designed on the assumption that users manipulate them with their middle finger. The operation piece 145 is designed on the assumption that users manipulate it with their ring finger.

Each of the operation pieces 141 to 145 is a switch which is pressed against the main body 100, thereby input is entered. For example, official controllers for PlayStation 4 (trademark) manufactured and sold by Sony Interactive Entertainment Inc. are equipped with push buttons called R1, R2, L1, and L2 buttons (trigger switches) on the back of the main body. The operation pieces 141 to 145 can employ the structures of these push buttons which are widely known or publicly known.

The controller for game machines also has a band 200. The band 200 has a band-like shape. Each end of the band 200 is attached to the main body 100 or near the proximal end of the grip 120 of the controller for game machines. With this, the band 200 alone or a combination of the band 200 and a portion of the surface of the main body 100 or the grip 120 forms a loop. The border of the main body 100 and the grip 120 is undecided but each of the ends of the band 200 may be attached either to the main body 100 or to the grip 120.

Users can hold the grip 120 with the left hand resting under the band 200. This reduces the risk of uses' dropping the controller for game machines from the left hand.

In this embodiment, one end of the band 200 is attached to an inner side of the grip 120 (i.e., the right side in FIG. 2) and the other end is attached to an outer side (i.e., the left side in the same figure) of the grip 120. Specifically, the both ends of the band 200 are attached to positions closer to the top of the upper portion (in FIG. 3) of the grip 120.

A portion around the middle of the band 200 in this embodiment is, but not limited to, wider than the ends thereof.

The band 200 in this embodiment is made up of, but not limited to, a band body 210 and a band pad 220. The band body 210 has the same width along the entire length thereof, and the band pad 220 is wider than the band body 210, thereby achieving the feature that a portion around the middle of the band 200 is wider than its ends. Of course, the band body 210 and the band pad 220 may be formed as a single member in such a manner that a middle portion of the band 200 is wider than the ends thereof.

The purpose of the band pad 220 is to stabilize the secure fixing of the user's left hand to the controller for game machines. The band pad 220 has a substantially oval shape so that it can contribute to this. The band pad 220 is made of a fabric material having an appropriate thickness with a sponge-like member inserted therein. The band body 210 has functions of, not only securing the left hand of the user with its entire length, but also positioning the band pad 220 at an appropriate position in the lengthwise direction of the band body 210. In other words, users can move the band pad 220 in the direction along the length of the band body 210 and place it at an appropriate position. By adjusting the position of the band pad 220 relative to the band body 210, it is possible to secure the controller for game machines to the left hand of the user in a more stable manner. The position of the band pad 220 relative to the band body 210 can be adjusted using two loop members 221 which are disposed on the outer surface of the band pad 220 and are fixed to the outer surface of the band pad 220 at both ends as a loop. By passing the two loop members 221 through the band body 210, the band pad 220 is attached to the band body 210 such that it can move on the band body 210 in the lengthwise direction of the band body 210. The loop members 221 and the band body 210 are configured such that an appropriate frictional resistance occurs between them. The frictional resistance allows the positioning of the band pad 220 at any position in the lengthwise direction of the band body 210.

The band body 210 in this embodiment is provided with, but not necessarily limited to, a buckle 211 at an appropriate position thereon. The buckle 211 is for adjusting the entire length of the band body 210. The sizes of the users' hand vary from user to user. By making the length of the band body 210 and, in turn, the length of the band 200 adjustable, it becomes possible to more stably fix the controller for game machines to the left hand of the user with the band 200.

The controller for game machines also includes a publicly- or widely-known cable 300 that conveys, to a game machine (not shown), data generated in the controller for game machines in response to the activations of the first input device 130 and the second input device 140. While only a small lengthwise portion of the cable 300 extending from the main body 100 is visible in all figures where it is illustrated, the actual one is longer. A connection terminal is provided at an end of the cable 300. By plugging the connection terminal into an input terminal (not shown) of a game machine, the controller for game machines can be connected to the game machine in a state where data can be transmitted.

While not illustrated because it is a publicly known or widely known technique, the controller for game machines has a built-in circuit board for generating, when the first input device 130 and the second input device 140 are manipulated, data according to these operations. When the first input device 130 and the second input device 140 are manipulated, the circuit board generates data according to the operations and that data is/are transmitted to the game machine via the cable 300.

While the data is/are wired from the controller for game machines to the game machine via the cable 300 in this embodiment, the data may be transmitted wirelessly by media such as radio waves and light.

Next, how to use the controller for game machines described above and operations thereof are described.

In using the controller for game machines, a user first connects the cable 300 to a game machine.

Then, the user adjusts the length of the band 200 of the controller for game machines, more specifically, the length of the band body 210 using the buckle 211 and adjusts the position of the band pad 220 in the lengthwise direction of the band body 210. The length of the band body 210 and the position of the band pad 220 relative to the band body 210 are adjusted in such a manner that when the user inserts his or her left hand into the loop formed by the band 200 or a combination of the band 200 and the surface of at least one of the main body 100 and the grip 120 of the controller for game machines and holds the grip 120 with the palm and the fingers other than the thumb of the left hand, the band body 210 and the band pad 220 secure the left hand of the user well.

In this state, the user inserts his or her left hand into the aforementioned loop and holds the grip 120 with the palm and the fingers other than the thumb of the left hand. At this time, the inner surface of the band pad 220 gets to touch the back of the user's hand.

In this state, the user plays a game. The user activates the first input device 130 and the second input device 140 at the exact moment necessary for the game progress.

The user manipulates the four-button directional pad 131 and the stick input device 132 included in the first input device 130 with the ball of the thumb. For the four-button directional pad 131, the user presses either one of the up, down, left, and right edges of the four-button directional pad 131. For the stick input device 132, the user displaces the end of the stick input device 132 to a certain direction at a certain angle.

Figure 8:
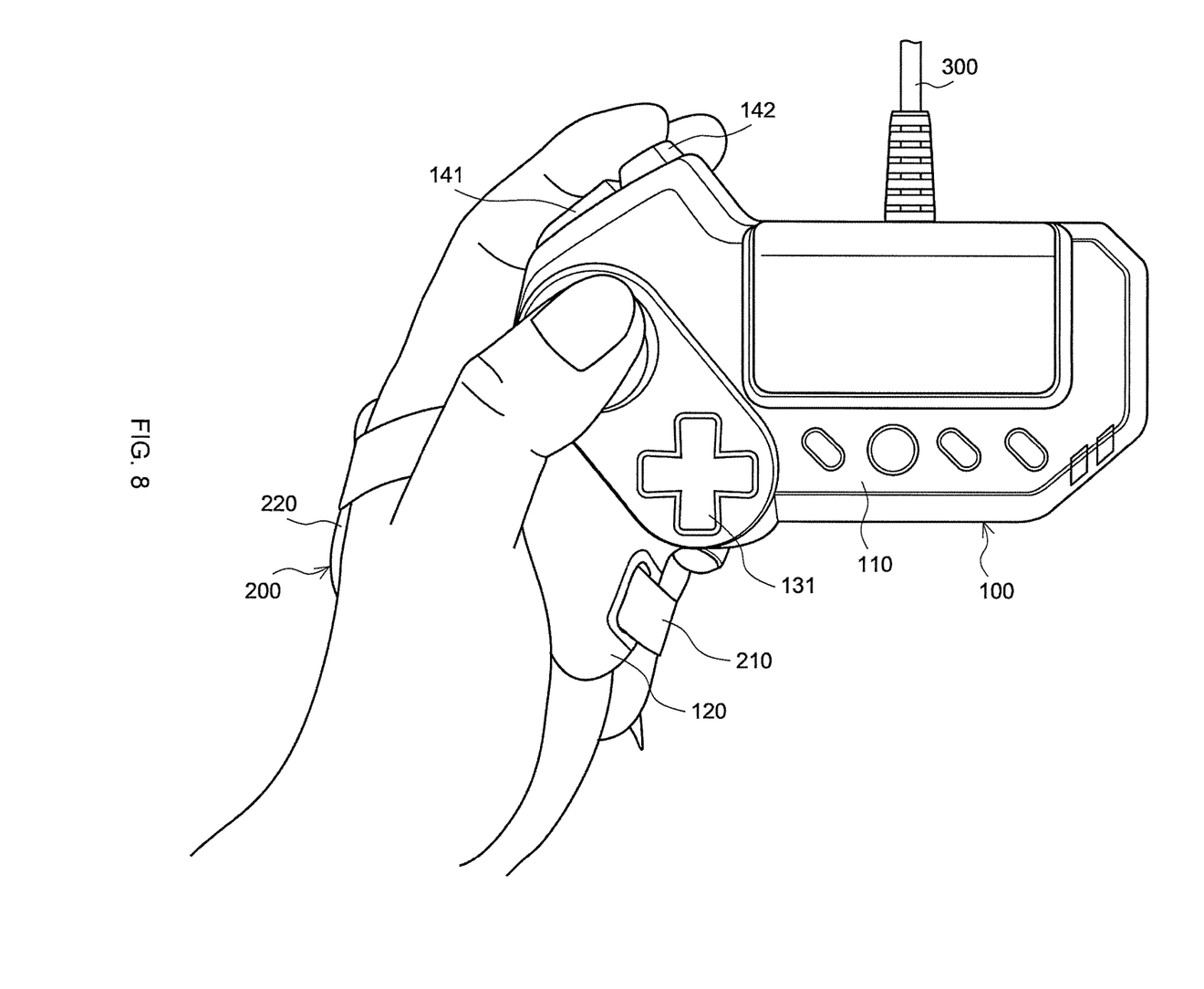
FIG. 8 is a plan view of the controller illustrating a state where the controller for game machines shown in FIG. 1 is used.
Figure 9:
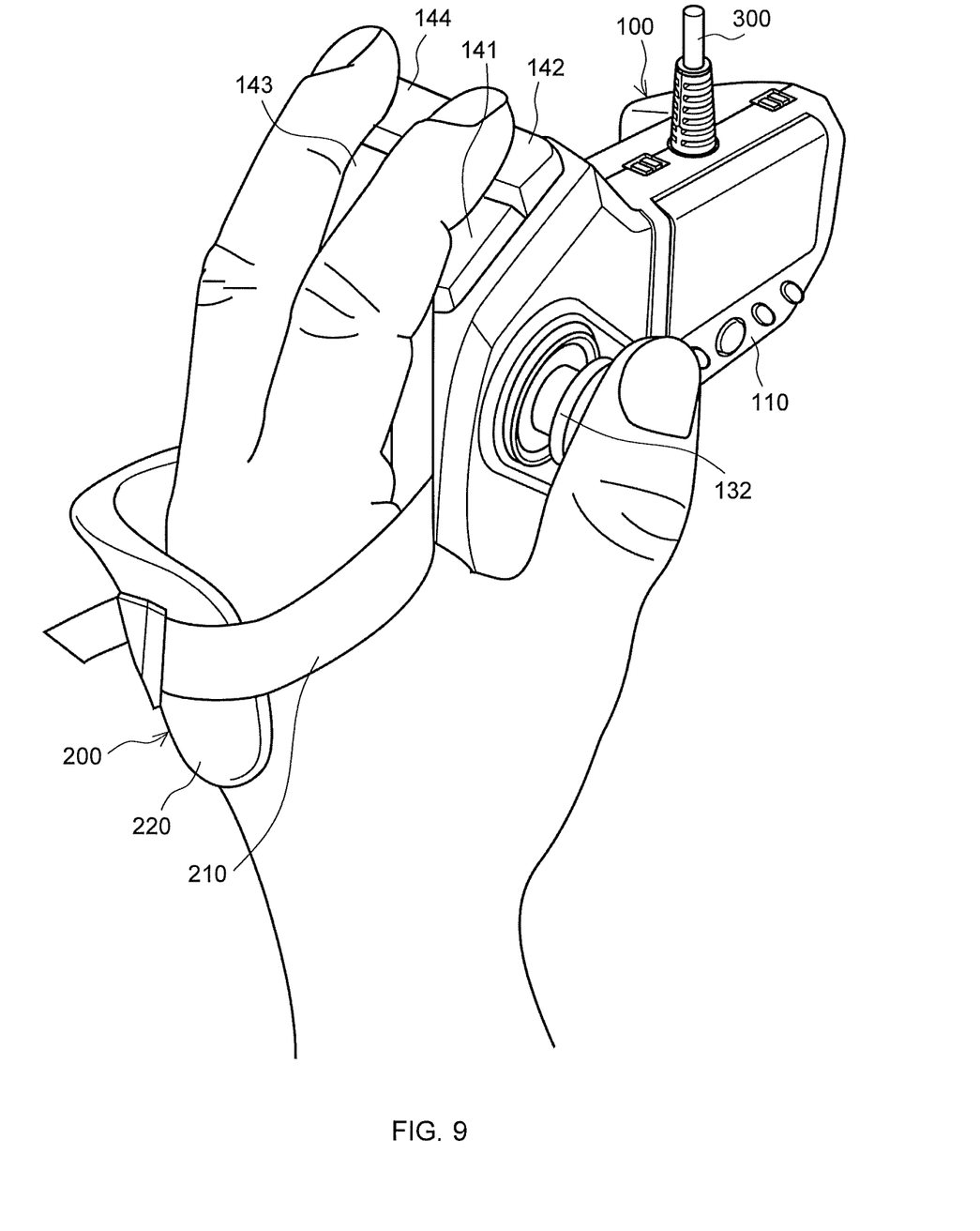
FIG. 9 is a perspective view of the controller illustrating a state where the controller for game machines shown in FIG. 1 is used.

On the other hand, the user manipulates the operation pieces 141 to 145 included in the second input device 140 using at least one finger other than the thumb of the left hand (FIGS. 8 and 9). Basically, the user manipulates the operation pieces 141 and 142 by pressing them against the main body 100 using the index finger. Basically, the user manipulates the operation pieces 143 and 144 by pressing them against the main body using the middle finger. Although not illustrated in FIGS. 8 and 9, the user manipulates the control unit 145 included in the second input device 140 using the left ring finger. The user can manipulate one of the operation pieces 141 and 142, one of the operation pieces 143 and 144, and the operation piece 145 simultaneously using the index finger, middle finger, and ring finger, respectively.

When the user manipulates the second input device 140 using the index finger, middle finger, and ring finger or using two or more of these fingers, the fingers used to manipulate the second input device 140 do not hold the grip 120. As a result, the grip 120 can be held only with the palm and the little finger of the left hand.

Under such circumstances, the controller for game machines can easily drop from the user's hand. However, the controller for game machines in this embodiment has the band 200. With the band 200, even in a state where the controller for game machines might slip out of the user's hand, the user can stably manipulate the first input device 130 and the second input device 140 without dropping the controller for game machines. Of course, when all of the four fingers other than the thumb are used to hold the grip 120, the user can manipulate the first input device 130 using the thumb in a more stable manner.

The data generated in the circuit board (not shown) by manipulating the first input device 130 and the second input devices 140 are transmitted to the game machine via the cable 300.

The invention claimed is:

1. A controller for game machines comprising:
    a main body having a substantially flat user-facing portion in an area visible from a user who is using the controller;
    a grip protruding from the main body that can be held by a user with a palm and a plurality of fingers other than a thumb of a hand of the user, the grip protruding toward the user, as defined in the case where the user is using the controller;
    a first input device disposed, as an input device, in an area on the user-facing portion of the main body, the area being manipulable with the thumb of the one hand of the user holding the grip; and
    a loop-shaped band having two ends, wherein one end of the band is attached to an outer side of the grip and the other end of the band is attached to an inner side of the grip, wherein the controller is configured such that the user can hold the grip with one hand with the user's plurality of fingers other than the thumb resting under the band.

2. The controller for game machines according to claim 1, wherein
    the first input device comprises at least one of a four-button directional pad for entering data indicating a direction by pressing either of up, down, right, and left edges thereof, and a stick input device through which data indicating a direction can be entered according to a displacement direction of the stick input device.

3. The controller for game machines according to claim 1, wherein:
    the controller further comprises a second input device disposed on a back side of the main body, the back side corresponding to a farther portion of the main body from a user, as defined in the case where the user is using the controller, and is manipulated with at least one finger other than the thumb of the one hand of the user.

4. The controller for game machines according to claim 3, wherein the second input device includes a plurality of operation pieces capable of being manipulated, the operation pieces being aligned vertically, as defined in the case where the user is using the controller.

5. The controller for game machines according to claim 4, wherein each of the operation pieces is a switch which is pressed against the main body, thereby input is entered.

6. The controller for game machines according to claim 1, wherein a portion around a middle of the band is wider than each of the ends of the band.

* * * * *